US 6,359,976 B1

(12) United States Patent
Kalyanpur et al.

(10) Patent No.: US 6,359,976 B1
(45) Date of Patent: Mar. 19, 2002

(54) SYSTEM AND METHOD FOR MONITORING SERVICE QUALITY IN A COMMUNICATIONS NETWORK

(75) Inventors: Gaurang S. Kalyanpur, Allen; Chad Daniel Harper; Grant Michael Brehm, both of McKinney; Chunchun Jonina Chan, Plano, all of TX (US)

(73) Assignee: Inet Technologies, Inc., Richardson, TX (US)

( * ) Notice: Subject to any disclaimer, the term of this patent is extended or adjusted under 35 U.S.C. 154(b) by 0 days.

(21) Appl. No.: 09/395,801

(22) Filed: Sep. 14, 1999

Related U.S. Application Data (63) Continuation-in-part of application No. 09/093,955, filed on Jun. 8, 1998, and a continuation-in-part of application No. 09/093,824, filed on Jun. 8, 1998, now Pat. No. 6,249,675.

(51) Int. Cl.[7] .......................... H04M 1/24; H04M 15/00

(52) U.S. Cl. ................. 379/134; 379/32.01; 379/32.02; 379/133; 379/111; 379/112.01; 379/114.01

(58) Field of Search ........................... 379/34, 112, 113, 379/114, 133, 134, 139, 140, 210, 32.01, 32.02, 111, 112.01, 112.06, 112.07, 112.08, 114.01, 114.14, 114.28, 242, 243, 244

(56) References Cited

U.S. PATENT DOCUMENTS

| 5,008,929 A | 4/1991 | Olsen et al. ................. 379/112 |
| 5,333,183 A | 7/1994 | Herbert ....................... 379/112 |
| 5,426,688 A | 6/1995 | Anand ............................ 379/5 |
| 5,438,570 A | 8/1995 | Karras et al. .............. 370/94.2 |
| 5,448,624 A | 9/1995 | Hardy et al. .................... 379/67 |
| 5,457,729 A | 10/1995 | Hamann et al. ............... 379/2 |
| 5,473,596 A | 12/1995 | Garafola et al. .............. 370/13 |
| 5,488,648 A | 1/1996 | Womble ....................... 375/13 |
| 5,521,902 A | 5/1996 | Ferguson ..................... 370/13 |
| 5,539,804 A | 7/1996 | Hong et al. .................... 379/33 |
| 5,550,914 A | 8/1996 | Clarke et al. ................ 379/230 |

(List continued on next page.)

FOREIGN PATENT DOCUMENTS

| EP | 0541145 A1 | 10/1992 | ............ H04M/3/36 |
| WO | WO 97/05749 A3 | 2/1970 | .......... H04M/15/00 |
| WO | WO 95/33352 | 12/1995 | ............ H04Q/7/34 |
| WO | WO 97/05749 A2 | 2/1997 | |
| WO | WO98/47275 | 10/1998 | ............ H04M/7/00 |

OTHER PUBLICATIONS

International Search Report (PCT/US 00/25070) dated Dec. 14, 2000.
George Pavlou et al., Intelligent Remote Monitoring, Oct. 16, 1995.

Primary Examiner—Binh Tieu
Assistant Examiner—Quoc D. Tran
(74) Attorney, Agent, or Firm—Fulbright & Jaworski LLP (57) ABSTRACT

A system and method for monitoring service quality using Call Detail Records (CDR) in a communications network, such as a Signaling System No. 7 (SS7) network, is disclosed. Network monitors capture substantially all signaling units in the SS7 network generate a complete record for all calls, transactions and other communications over the network. Users configure CDR profiles that are used to filter the records. A CDR application filters the records by parsing out signaling unit components that have been selected by the user in the CDR profile. The selected message components are then formatted into a CDR record, which is sent to an external system that generates certain statistics for the message records and stores the statistics to a database. A report application recalls the statistics from the database and presents statistics in a reporting format configured by the user. The reports indicate the statistical performance of network providers for selected called or calling telephone numbers or for selected services. The CDRs and statistics are available to a user either in real-time or in response to a query of historical CDR data. The network quality monitoring system is separate and independent from the network monitoring equipment.

10 Claims, 4 Drawing Sheets

U.S. PATENT DOCUMENTS

| | | | |
|---|---|---|---|
| 5,550,984 A | 8/1996 | Gelb | 395/200.17 |
| 5,579,371 A * | 11/1996 | Aridas et al. | 379/34 |
| 5,590,171 A | 12/1996 | Howe et al. | 379/33 |
| 5,592,530 A | 1/1997 | Brockman et al. | 379/34 |
| 5,675,635 A * | 10/1997 | Vos et al. | 379/113 |
| 5,680,437 A | 10/1997 | Segal | 379/10 |
| 5,680,442 A | 10/1997 | Bartholomew et al. | 379/67 |
| 5,694,451 A | 12/1997 | Arinell | 379/34 |
| 5,699,348 A | 12/1997 | Baidon et al. | 370/242 |
| 5,699,412 A | 12/1997 | Polcyn | 379/89 |
| 5,703,939 A | 12/1997 | Bushnell | 379/113 |
| 5,706,286 A | 1/1998 | Reiman et al. | 370/401 |
| 5,712,908 A | 1/1998 | Brinkman et al. | 379/119 |
| 5,729,597 A | 3/1998 | Bhusri | 379/115 |
| 5,737,399 A * | 4/1998 | Witzman et al. | 379/112 |
| 5,757,895 A | 5/1998 | Aridas et al. | 379/136 |
| 5,793,771 A | 8/1998 | Darland et al. | 370/467 |
| 5,799,073 A | 8/1998 | Fleischer, III et al. | 379/113 |
| 5,822,401 A | 10/1998 | Cave et al. | 379/34 |
| 5,825,769 A * | 10/1998 | O'Reilly et al. | 370/360 |
| 5,828,729 A | 10/1998 | Clermont et al. | 379/34 |
| 5,854,824 A | 12/1998 | Bengal et al. | 379/34 |
| 5,854,835 A | 12/1998 | Montgomery et al. | 379/119 |
| 5,867,558 A | 2/1999 | Swanson | 379/34 |
| 5,875,238 A | 2/1999 | Glitho et al. | 375/116 |
| 5,881,132 A | 3/1999 | O'Brien et al. | 379/35 |
| 5,883,948 A | 3/1999 | Dunn | 379/210 |
| 5,892,812 A | 4/1999 | Pester, III | 379/34 |
| 5,912,954 A | 6/1999 | Whited et al. | 379/115 |
| 5,920,613 A | 7/1999 | Alcott et al. | 379/114 |
| 5,999,604 A * | 12/1999 | Walter | 379/133 |
| 6,028,914 A | 2/2000 | Lin et al. | 379/14 |

* cited by examiner

SYSTEM AND METHOD FOR MONITORING SERVICE QUALITY IN A COMMUNICATIONS NETWORK

RELATED APPLICATIONS

This application is a continuation-in-part of pending application Ser. No. 09/093,955, filed on Jun. 8, 1998, entitled SYSTEM AND METHOD FOR MONITORING SERVICE QUALITY IN A COMMUNICATIONS NETWORK; and Ser. No. 09/093,824, now U.S. Pat. No. 6,249,675, entitled TRANSACTION CONTROL APPLICATION PART (TCAP) CALL DETAIL RECORD GENERATION IN A COMMUNICATIONS NETWORK, filed Jun. 8, 1998 and issued Jun. 19, 2001. The disclosure of which are hereby incorporated by reference herein.

The present invention is also related to the following pending applications: Ser. No. 09/057,940, entitled SYSTEM AND METHOD FOR MONITORING PERFORMANCE STATISTICS IN A COMMUNICATIONS NETWORK, filed Apr. 9, 1998; Ser. No. 09/092,428, entitled SYSTEM AND METHOD FOR DETECTING HIGH MESSAGE TRAFFIC LEVELS IN A COMMUNICATIONS NETWORK; Ser. No. 09/092,699, entitled SYSTEM AND METHOD FOR SIGNAL UNIT DATA STORAGE AND POST CAPTURE CALL TRACE IN A COMMUNICATIONS NETWORK; Ser. No. 09/092,256, entitled SYSTEM AND METHOD FOR GENERATING QUALITY OF SERVICE STATISTICS FOR AN INTERNATIONAL COMMUNICATIONS NETWORK; and Ser. No. 09/092,771, entitled SYSTEM AND METHOD FOR CORRELATING TRANSACTION MESSAGES IN A COMMUNICATIONS NETWORK, all filed Jun. 5, 1998; and Ser. No. 09/094,122, entitled SYSTEM AND METHOD FOR CORRELATING TRANSACTION MESSAGES IN A COMMUNICATIONS NETWORK, filed Jun. 9, 1998; and Ser. No. 09/156,328, entitled SYSTEM AND METHOD FOR MONITORING LINK STATUS IN A COMMUNICATION NETWORK, filed Sep. 18, 1998. These applications are commonly assigned and are hereby incorporated by reference herein.

TECHNICAL FIELD OF THE INVENTION

The invention is related to monitoring service quality in a communications network, such as in a Signaling System Seven (SS7) network, and, more particularly, to real-time and historical processing of Call Detail Records (CDR) to determine network service quality.

BACKGROUND OF THE INVENTION

Common channel signaling networks, such as the Signaling System Seven (SS7) based signal system, use dedicated channels to pass digital messages between systems for call setup, call control, call routing, and other functions. These dedicated signaling channels are part of a network that is separate from the network that carries the actual voice and data signals. An SS7 network is a separate switching system which is used prior to, during, and at the end of an actual voice or data call. The SS7 network is used to route control information. Whenever two switches or elements have to pass call control information during or prior to a phone call, they pass this data via the SS7 signaling network.

There are three basic types of network node elements in an SS7 network. One of them is the Service Switching Point (SSP), which may be a central office switch, a tandem switch or an end office switch. A second principal node element is the Service Control Point (SCP). An SCP acts as a database query server for the rest of the network. An SCP is used in such applications as translating ported telephone numbers, routing 800 calls, tracking roamers in a cellular network, and Alternate Billing Service/Line Identification Database services (or ABS/LIDB) which provide operator-type services. The third principal node element is the Signal Transfer point (STP). An STP is essentially a packet switch that routes the messages from SSPs and SCPs to SSPs and SCPs.

It is possible to combine these three different types of nodes into a single node. However, in North America, they are typically not combined. An SSP performs only switch functions, an SCP only control functions, and an STP only signal transfer functions. In European telecommunications systems, all of these different functions may be combined into one node.

The SS7 network carries a great deal of information and is extremely critical to the operation of the phone system. If an SS7 network is not functioning, or if portions of it are not operating, the phone system simply cannot deliver phone calls, even though all of the voice circuits are operating properly. The capacity and complexity of the SS7 network is small in terms of circuitry and bandwidth utilized by an end user compared to previous voice and data networks. The circuitry of the SS7 network is therefore much more critical. The actual elements in the SS7 network do not provide all the information required in network operations to manage and to determine the health and state of an SS7 network. It is therefore necessary for the telephone industry to deploy surveillance equipment to monitor the links connecting the nodes of the SS7 network.

The topology of the network is such that STPs are typically deployed in a mated pair configuration at geographically separate locations. Connected to a mated pair of STPs will be a set of SSPs and SCPs. This conglomeration of SSPs, SCPs and mated Pair STPs is called a cluster. Clusters are then connected by D-Quad links between STP mated pairs. The mated pair configuration system is not required and it is not used in all communications systems capable of employing the present invention.

When any call, transaction or message is sent between two different devices on the network, it is often the case that the messages going from switch A to switch B travel one route on the network while the messages going from switch B to switch A travel a different route. The network surveillance equipment that monitors the link is designed to capture and correlate as much signaling information as possible regardless of network activity. Because of the different data paths that messages may take, it is difficult to do this correlation above what is called the transport layer when monitoring links at the STP sites. An example of an application level problem would be where a subscriber has a problem getting his/her calls delivered. The telephone company may attempt to fix the problem by doing a trace of all data pertaining to that subscriber's phone number, but the data may not all be located at one point. The data may be all in one STP, or split in some fashion, partially in one STP and partially in the other STP of a mated pair, which may be in a different city many miles away.

It is an object of the present invention to process call detail records from a monitoring system that correlates substantially all calls and transactions in a communications network and generates call detail record data from the call and transaction records.

SUMMARY OF THE INVENTION

These and other objects, features and technical advantages are achieved by a system and method in which call detail records (CDR) are received from a network monitoring system. The monitoring system generates CDRs for calls, transactions, and/or other communication on a network. For example, the monitoring systems may have network monitors that capture communication messages and message signal units (MSU) from links in a communications network. The links may be between the originating, intermediate, and terminating nodes, switches or end offices. The messages or MSUs are captured and used to generate call detail records. A network of signal monitoring units may capture and correlate all messages for a particular call, transaction or other communication. Preferably, the monitors have a plurality of processors for processing the captured messages or MSUs. The processors may run any of a number of message or record processing applications.

Typically, CDR profiles are used to determine which messages or other data should be included in the CDRs. The CDR profile comprises particular parameters that are used to identify relevant calls, transactions or other communications. After a transaction record is selected, specific information is extracted to create a CDR record. Users define both the CDR profile, which is used to select relevant records, and the CDR format, which defines how the CDR data will be sent to the user. The CDR data is sent to a quality monitoring system in a formatted CDR stream. The CDR data may be used to monitor network quality in real-time. Additionally, the CDR data may be stored so that historical network analysis may be performed. The CDRs may also be processed by other applications, such as billing or fraud applications.

Typically, the CDR is generated when a call is completed. The CDR includes information such as the originating network, terminating network, and length of trunk usage for the call. Since the identity of the originating service provider and the duration of the call or transaction are contained in the CDR, a CDR billing application may be used for generating interconnection revenue for reciprocal compensation. External applications may use the CDR data to generate bills or track SS7 bandwidth use. The CDR data can be ported to a customer's external application, where the call can be rated and a bill or invoice can be generated for the transaction or call.

In the present invention, a quality assurance application provides an integrated platform for message tracking on a per customer and/or a per service provider basis. The tracked messages may be part of one of a number of message protocols, such as Integrated Services Digital Network—User Part (ISUP), Telephone User Part (TUP), Network User Part (TUP), Transaction Capabilities Application Part (TCAP), Advanced Intelligent Network (AIN) or Integrated Network Application Part (INAP) calls or transactions. The quality assurance application is useful for larger networks or for evaluating service quality of application-layer services, such as FNAP, Global System for Mobile Communications (GSM), AIN, IS-41 and 800/LIDB/CLASS.

The system disclosed herein comprises a number of monitors which are capable of non-intrusively monitoring all of the links in a communication network, such as an SS7 network. CDR data is initially collected from the various SS7 links. The monitors that are connected to the links store the data in a binary format. The binary data is then continuously sent to the central server where it is stored to disk. This application can be used in conjunction with the monitor's server, or customers may choose to deploy a dedicated CDR server, separate from the system. The server also correlates partial CDRs that have been collected from different "legs" of each individual call to formulate a complete CDR. At the server, CDRs are formatted from binary into ASCII-formatted records based on a CDR format that is selected by the user. The size and processing power of the server are scaled based on the number of CDRs, the network-wide call rate, and the bandwidth capacity of the customer's transport network. The formatted CDR binary streams are sent to the user's billing system using any standard or customized File Transfer Protocol (FTP). Additional data formatting may be performed in the customer's external billing system.

In order to generate CDRs, users create profiles that tell the monitor system how to collect SS7 information from the signaling links. The profiles contain all of the information required to generate CDRs. Multiple profiles can be created to be used simultaneously on the system. The profiles may include parameters such as the calling party number, called party number, mobile identification number (MIN), point codes, and application type. Essentially, any component of a transaction signaling unit may be used as a filter parameter.

In one embodiment, the quality assurance application runs on a server that is external to the network monitoring system. The monitoring system provides data to the external server in the form of Call Detail Records (CDRs). The quality assurance application tracks the quality of service that is provided to customers on a particular communications network. The present invention allows customers, service providers and others to monitor how a service is performing not only within the network infrastructure, but also how well that service is working on a call-by-call, customer-by-customer basis. Additionally, the present invention allows service providers to efficiently manage network services without requiring an increased support staff.

The quality assurance application runs on an independent server and processes CDRs that are received from the monitoring system. In an exemplary embodiment, individual monitoring units exchange and correlate messages into call or transaction records. The monitoring unit then filters the records using a CDR profile to determine which records, and which messages, should be combined to form the CDR. The monitoring units then transmit the CDRs directly to the external server. In an alternate embodiment, some other entity in the monitoring system such as a central server, may generate and forward CDRs to the independent quality assurance application.

A CDR collection process on a CDR server collects all of the legs of a transaction, call or other communication and correlates the individual leg information into a single CDR. The CDR is then put in the required format. The CDR consists of data from multiple message that are related to a single transaction, call or message.

The CDR server, which may or may not be a dedicated server, acts as a client and initiates the connection to an external system on a predefined port number. A configuration file on the CDR server designates an IP address and port where all the formatted CDRs are to be directed. All CDRs will be streamed to the external system and no application level protocol will be followed. The underlying protocol will be TCP/IP. All MSUs related to a single transaction are packetized in a single CDR and a CDR will be generated and sent for every transaction. The CDRs are destroyed as soon as they are successfully transmitted from the CDR server to the external system. No acknowledgment is expected from the external system for CDR receipt. For each unique pointcode in a profile the server spawns a TCP/IP connection to an external system to send CDRs. If the pointcode is repeated in multiple profiles, only one connection shall be established. A configuration file lists the pointcode to connection/port number mapping. If a pointcode is not listed in the configuration file, CDRs generated for this pointcode will be destroyed immediately. A log is kept to track when the connections are established or down and to track the numbers of CDRs sent and dropped hourly and daily.

The configuration file mapping method may also be defined to provide a CDR profile to connection mapping. In this case, all CDRs generated by a profile are sent to the same destination.

The CDR server may store CDRs on a local disk using a predefined file naming convention so that all CDRs for a profile are stored in one file. New files are created for a defined interval and, as soon as the file is closed, an external system can retrieve the file using FTP, or some other protocol.

The quality assurance application provides service quality analysis tools and reports. The application generates historical statistic reporting for circuit-based services or for application-layer services. The statistics are maintained in a database which can be accessed to generate quality of service reports. When used to monitor service on an SS7 network, the present invention provides users with the capability to select from a number of parameters which can be used to filter call, transaction or other communication records. Filters may be based upon called and calling numbers, or groups of digits within the called or calling numbers. Additionally, application types and point codes may be used as filter parameters.

The quality assurance application maintains statistics for all ISUP/TUP circuit-based calls. Statistics are maintained by called number, calling number and translated number. Users may generate reports for the statistical information by accessing the database through a workstation. The reports may be customized using various indices, such as by called, calling, or translated number.

Additional statistics may be monitored and other reports may be created for other communications networks or protocols. For example, TCAP statistics may be monitored and reports may be generated by service as well as by called, calling and translated number. Statistics for other application layer services could also be monitored. Such as for INAP, GSM, AIN, IS-41 and 800/LIDB/CLASS services.

Communications network monitoring equipment which may be used in conjunction with the present invention is disclosed in U.S. Pat. No. 5,592,530, entitled TELEPHONE SWITCH DUAL MONITORS; and in the above-referenced pending patent applications the disclosures of which have been incorporated by reference herein. Additionally, the present invention may be used with any network monitoring equipment or other equipment that generates call detail records. Such network monitoring equipment may include hardware and/or software that is integral to a communications network node. Alternatively, the monitoring equipment may be external hardware and/or software that detects call, transaction or other messages passing over communications links between network nodes. The systems and methods disclosed herein are capable of receiving and processing call detail records from any source. As used herein, the term call detail record refers to any record or message that comprises data related to a call, transaction or other communication on a network.

It is a feature of the present invention to track performance statistics for a communications network. The invention provides statistical reports that allow users to determine the reason for call failures and to identify portions of the network which are not operating properly.

It is another feature of the present invention to allow customers, service providers and third parties with the ability to monitor a the quality of service on a particular communications network. Customers can use the statistical reports to determine their service provider's quality of service. The present system can also be used by customers to determine if the customers' systems are providing adequate service. For example, call centers can use the statistical data to determine whether additional agents are needed to answer calls that have been dropped due to busy lines. Service providers may use the information to monitor the service provided by their network and to identify failure points on the network. Service providers can also monitor the quality of service provided by other service providers on other networks.

It is an additional feature of the invention to generate statistical reports for called, calling or translated numbers or for services. Additionally, users can designate particular link sets to be used for the statistical report generation. As a result, only those monitors capturing messages from the designated link sets will send CDRs to the quality of service application.

It is another feature of the present invention to provide statistical reports in real-time on a network-wide basis for both calls and transactions. Historical reports may also be created from CDR data that is stored to a database.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
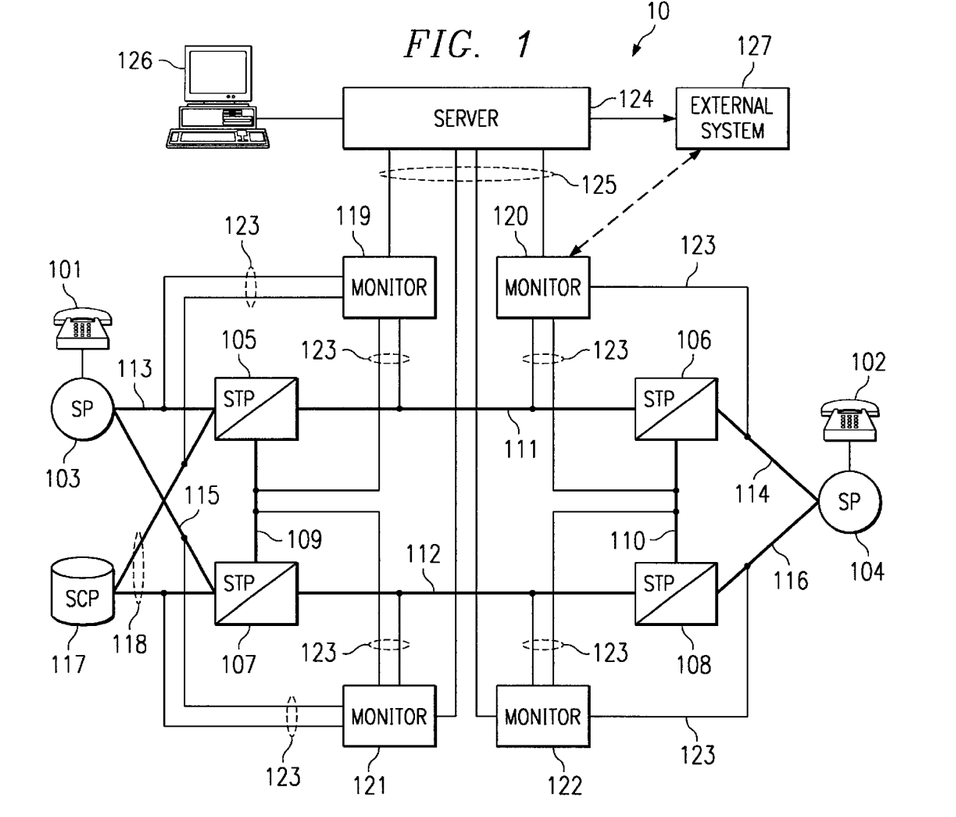
FIG. 1 is a block diagram of an exemplary communications network and monitoring system.

FIG. 1 is a block diagram of communications network 10 in which telephones 101 and 102 communicate via a signaling network, such as an SS7 network. It will be understood that telephones 101, 102 are used for illustration purposes only and that any voice or data communications device may be connected to the network. In the embodiment illustrated in FIG. 1, telephones 101 and 102 are connected to end offices 103 and 104, which may be Signaling Points (SP), as shown, or SSPs. End offices 103 and 104 are linked to each other through a signaling network comprised of STPs 105–108, which are connected via links 109–112. SPs 103 and 104 are connected to STPs 105–108 via links 113–116. Calls, transactions and other signals or messages between end office 103 and end office 104 may take any of a number of paths across links 109–116 and through STPs 105–108.

Typically, a series of signals that are related to one call or transaction will traverse across the same path through network 10 from one end office to another. For example, for a particular transaction, all signaling units sent from SP 103 may cross links 113, 111, and 114 through STPs 105 and 106. However, network problems or system failures may cause different signals for the same transaction to take different paths. It is also typical that signals traversing the system in the reverse direction may use a different path through the network. For example, for the same transaction illustrated above, signals from SP 104 may traverse links 116, 112, and 115 through STPs 108 and 107. Therefore, a single link or network element may not see all the messages or signals for one complete transaction or call.

In certain circumstances, such as for an 800 number call or for a call to an exchange or number that has been ported to a different switch, message may be sent to SCP 117 to perform various database look-up functions. Signals or messages are exchanged with SCP 117 via links 118. In other embodiments, there may be additional components in network 10, such as Service Nodes (SN) or Intelligent Peripherals (IP), which would require additional signal paths.

In network 10, monitors 119–122 are individually paired with STPs 105–108. Each monitor 119–122 is coupled to every link for a particular STP by connections 123, which may be embodied as a branch or tee off of links 109–116. This allows monitors 119–122 to capture or detect every signaling unit that is sent to, or from, each STP 105–108. As described in U.S. Pat. No. 5,592,530 and application Ser. No. 09/057,940, monitors 119–122 are coupled via an inter-monitor communications link (not shown) which allows monitors 119–122 to transfer captured signaling units and messages among themselves. Typically, the first monitor to detect a signaling unit for a call or transaction is designated as a controlling or anchor monitor. The other monitors then send any later detected signaling units for the same transaction or call to the anchor monitor. The anchor monitors correlates all of the messages from a particular transaction or call into a single record. Usually, each signaling unit is identified as belonging to a particular transaction by the Transaction Identifier (TID).

Monitors 119–122 are connected to server 124 via connection 125, which may be a Wide Area Network (WAN) or any other data network connection. Once a call or transaction record is complete, the record is then sent to server 124 for further processing. Monitors may determine that a record is complete when an end message is detected for that particular call or transaction. Workstation 126 is connected to server 124 and may be directly connected to monitor 119–122. Workstation 126 provides network service providers or other users with access to retrieve data or to configure server 124 or monitors 119–122.

Monitors 119–122 detect and correlate TCAP messages from network 10. These messages are used to generated binary call detail records (CDRs) which are streamed to server 124 over WAN 125. Server 124 formats each binary TCAP CDR stream into a format selected by a user or customer and forwards the formatted TCAP CDR data to the customer's external system 127. The TCAP CDR data may be sent to external system 127 either from server 124 or directly from the network monitors, such as from monitor 120 as illustrated.

The user sets up a profile on workstation 126, such as a SUN workstation. The user may interact with workstation 126 via a Graphical User Interface (GUI) to configure the CDR profile. The profile is a filter having certain criteria configured by the user. System 127 may be comprised of a server or other processor which is capable of using the CDR data to rate and bill transactions on network 10. External system 127 may be a quality of service application that processes CDRs and generates historical and/or real-time reports on network quality.

Typically, the CDRs are created at transaction termination. The binary CDRs are sent via Transmission Control Protocol/Internet Protocol (TCP/IP) to the server listed in the CDR profile for further processing. A collection process on server 124 then collects all legs of a transaction and correlates the data into a single CDR. The CDR consists of multiple signaling units which are related to a single transaction, for example, the entire TCAP dialogue, including prearranged ends and time-outs. Each CDR is assigned a unique sequence number during the CDR collection process. The CDR is then formatted as defined by the user and sent to external system 127. In one embodiment, server 124 acts as a client and initiates a connection to the external system on a predefined port number.

Monitors 119–122 are capable of monitoring a multitude of SS7 links at one time. A unique identifier, or CDR sequence number, is generated for every CDR and uniqueness is guaranteed system wide. The CDR application can be configured in a sampling mode with the sampling rate determined on a per profile basis. The maximum sampling rate is decided based on the monitor system sizing. Preferably, the sampling rate can be selected from 1% to 100% in increments of 1%. In the preferred embodiment, monitors 119–122 contain software that delivers the signaling units captured from the SS7 network to a CDR filtering process for evaluation. Server 124 is responsible for tracking all CDR configurations set up by the user and for downloading CDR configurations to monitors 119–122 as necessary. Depending upon the configuration selected by the user, monitors 119–122 determine if a message has passed the filter criteria. If a message does pass the criteria, it is sent to a tracking task located on monitors 119–122 and then to server 124. In the event a message does not match the characteristics defined by a user, the message will be discarded.

Server 124 may be a single server or it may be embodied as two or more servers having separate functions. For example, one server may act as a central information point for all entities of the monitoring system and another server may control CDR processes. Any entity needing common information can obtain that information from a monitoring system server database. The database control on the monitoring system server includes configurations for all monitor applications. In this embodiment, the CDR configuration information can be stored on the monitoring system server in a configuration file. At the start of a CDR generation session, the CDR configuration file is downloaded to specific monitors over network 125.

Either server 124, or a separate CDR server, maintains another CDR configuration file to provide mapping of CDR profile names to virtual connections. This file lists CDR profile names and the corresponding connection identifications on which external system is expecting the CDRs for that profile. The CDR configuration file also comprises a mapping of the virtual connection identifiers to their connection names. In the preferred embodiment, multiple CDR profiles can be mapped to a single virtual connection identifier, but a single CDR profile cannot be mapped to multiple connection identifiers.

Server 124, or the CDR server, performs CDR processing. The CDR process collects all binary CDRs from monitors 119–122 and format the CDRS. The formatted CDR is then sent via TCP/IP to an external system. Each profile in the configuration file can instruct monitors 119–122 to send binary CDRs to different servers or workstations 126. However, it is mandatory that a CDR collection process should be running and listening on the assigned IP address and port.

External system 127 shall act as a server and listen on a pre-defined port number for incoming CDRs. Server 124 shall act as a client and initiate a connection to the external system on a predefined port number. Server 124 is capable of spawning multiple connections based on the configuration file and the number of configurations are configurable. Server 124 is also capable of communicating with multiple external servers. Server 124 can send formatted CDRs that have been generated using different profiles to different servers.

The formatted CDRs may be queued in a list to be sent to external system 127. If there is a loss of communication on a port, up to 512 CDRs shall be stored per connection. When the CDR queue is full, the CDRs will be deleted on a First-In-First-Out (FIFO) basis. On start-up, after a communication failure, any pre-existing CDRs shall be sent to the external system before any of the new CDRs are sent. A connection acceptance message from external system 127 contains the last sequence number received. Server 124 reads the sequence number and sends the next available CDR. In some situations, the first CDR transmitted after communication re-establishment may not be the CDR external system 127 was expecting. Thus, there is a potential for data loss if the connection is down for a long time.

The following messages may be logged to a daily file on a per connection basis:

Connection Established;

Connection Down;

Number of CDRs Sent (per hour);

Number of CDRs Dropped (per hour); and

Daily Total Number of CDRs Sent and Dropped.

Local time and date are indicated on each message and the logical connection name is included on each line.

As discussed above, workstation 126 has a GUI configuration interface that enables users to select the signaling groups and point codes to be used in configuring the CDRs. The GUI allows users to add, modify, or delete CDR profiles. The CDR configurations are active until they are deleted. Once a profile is activated, the user is notified. The CDR profiles indicate the address and port for the external system 127, which is collecting the CDRs. All CDRs generated by a profile are sent to the destination IP address via TCP/IP.

Filters may be selected for called, calling and translated numbers based on the selected protocol, such as INAP, 800, or IS-41. The CDR configuration supports the use of wildcards for point codes or system nodes. Additionally, wildcards are supported for phone numbers. Wildcards allow the user to configure profiles which encompass all of the point codes, network nodes, or telephone numbers having a common series of numbers, such as a common area code or exchange. For example, the wildcard telephone number "1-NPA-*" for a called number can be used to filter out all records for calls or transactions to a telephone number in the "NPA" area code.

TABLE 1 is a list of the parameters that customers can use to create CDR profiles. The CDR profiles tell monitors 119–122 how to collect SS7 information from the signaling links. The profiles contain all of the information that is necessary to generate CDRs. A single customer can generate multiple profiles and each profile can include different parameters.

TABLE 1 is a list of the parameters that can be used to create CDR profiles.

TABLE 1

Call State that Triggers the CDR Generation
    Address Complete
    Answer
    Call Termination
Application Type
    ANSI ISUP
    ITU ISUP
    ITU TUP
    ITU NUP
    IS-41
    CLASS
    LIDB
    AIN
    INAP
    National Variants
    Toll Free/800
Point Codes
    OPC
    DPC
Calling Party Numbers
Called Party Numbers
Translated Numbers
Dialed Digits
Destination Digits
Mobile Identification Number (MIN)
Routing Numbers
Account Numbers
Electronic Serial Number
Location Routing Number TABLE 2 lists the fields of a preferred CDR format and the definitions of the field contents.

TABLE 2

| | |
|---|---|
| Length of Entire CDR | |
| Length of Fixed Fields | Indicates the length of the fixed CDR fields. The value is the number of bytes after the "Length of Fixed" field to the "User Field Length" field. |
| CDR Sequence Number | Numeric value that uniquely identifies the call record within the monitoring system. Uniqueness is guaranteed system wide. The system also uses this number to indicate the delivery monitor and its process ID. |
| CDR Condition Indicator | Indicates various conditions within a call/transaction. |
| Date/Time of Transaction Start | GMT time when a transaction begins. |
| Date/Time of Transaction End | GMT time, when a transaction end message is encountered. |
| CIC | Carrier Identification Code |
| OPC | Network indicator, protocol as well the origination pointcode of the call. |
| DPC | Network indicator, protocol as well the destination pointcode of the call. |
| Abort Reason | Abort cause of the transaction. |

TABLE 2-continued

| | |
|---|---|
| Application | SSN of the concerned application. |
| Number of Calling Party Digits | The number of digits in the calling party number. |
| Calling Party Number | The phone number identified as the calling phone number. |
| Number of Called Party Digits | The number of digits in the called party number. |
| Called Party Number | The phone number identified as the called phone number. |

TABLE 3 lists the user defined fields of a preferred CDR format and the definitions of the field contents.

TABLE 3

| | |
|---|---|
| User Fields Length | Indicates the length of the user-defined CDR fields section. The value is the number of bytes after this field to the end of the user defined fields. |
| MSU Fields Length | Indicates the total length of the MSU section. The value is the number of bytes after this field to the end of the CDR. |
| Number of MSUs | Indicate the total number of the MSUs in this CDR. |
| Time Stamp | GMT time, when this transaction was encountered. |
| Link Number | Indicates the link identifier on which the MSU was encountered. |
| MSU Length | Indicates the total length of the MSU following. |
| MSU | Actual MSU that was captured by the monitoring system. |

Table 4 lists the fields for a CDR format with Integrated Services Digital Network-User Part (ISUP) parameters.

TABLE 4

RIN Parameter
UUI Octets
USR Messages
UUI Indicator
Calling Party Nature of Address
Redirecting Number Nature of Address
Original Called Number Nature of Address
Location Number Nature of Address
Redirection Information
TMR Value
Calling Party's Category
Number of Redirecting Number Digits
Redirecting Number
Number of Original Called Digits
Original Called Number
Number of Location Number Digits
Location Number
User Definable Parameters The CDR billing application may be enhanced to include a generic CDR formatter. This formatter would have a GUI front-end configurator that allows multiple possibilities for defining CDR contents. This would allow customers to tailor the CDR to their particular needs. Additionally, the TCAP CDR generation system may be used for service-based billing, including Intelligent Network services based on the INAP/AIN applications.

Figure 2:
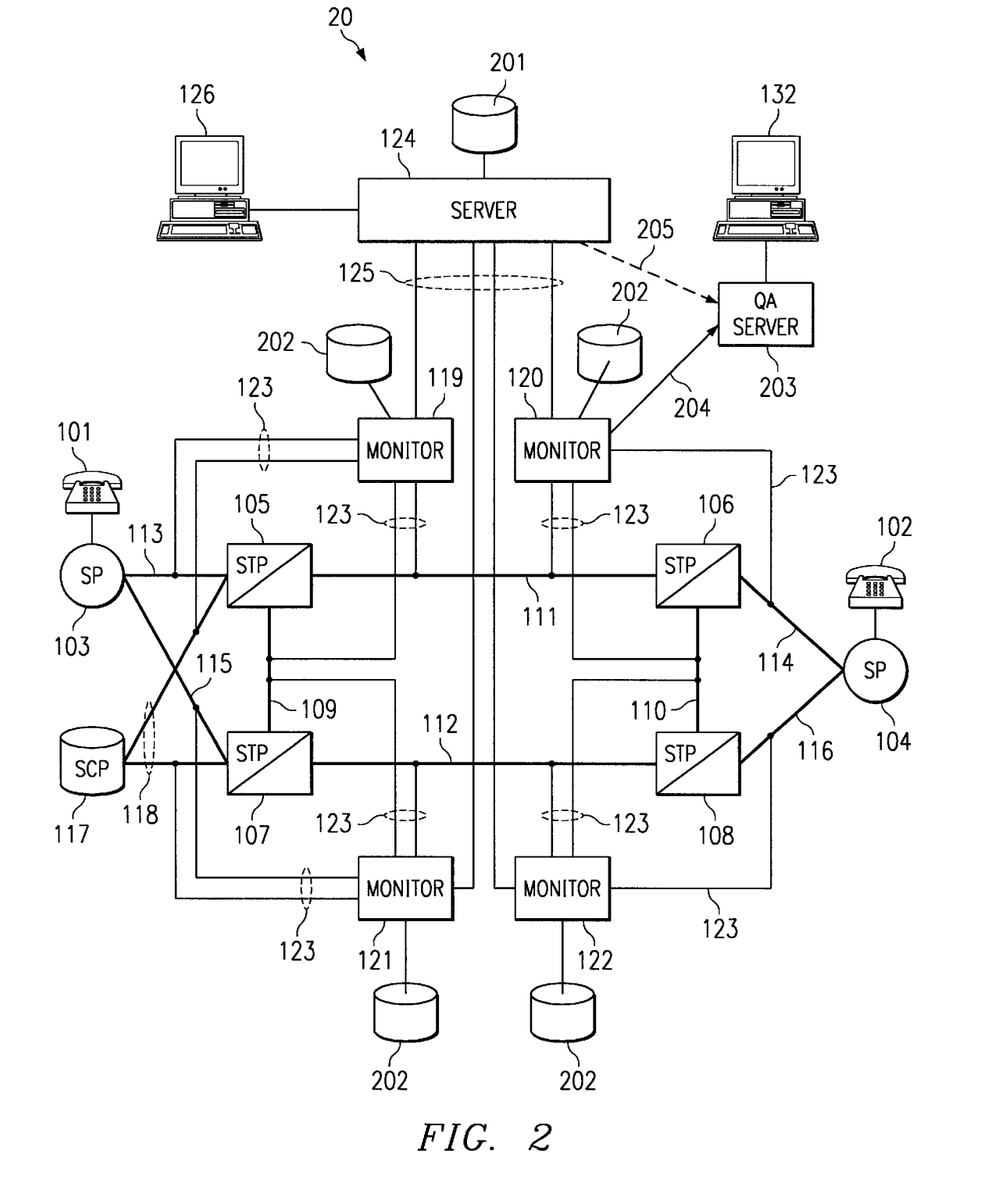
FIG. 2 is a block diagram of exemplary quality assurance system connected to a network monitoring system.

FIG. 2 illustrates another exemplary embodiment of a network quality monitoring system. Server 124 is coupled to data storage device 201 and monitors 119–120 are coupled to data storage device 202. Memory units 201 and 202 may be used to store configuration and profile data for use by the monitoring system. Monitors 119–122 may use memory a local memory, such as 202, to store call or transaction records, or other message data. Alternatively, records and messages may be routed to server 124 for storage on a central database, such as data storage device 201.

Monitors 119–122 filter the correlated messages and the call and transaction records to generate a CDR data stream that is sent to independent server 203 via link 130. Although it is not shown in FIG. 2, in the preferred embodiment, each monitor 119–122 is linked to server 203 by a connection, such as 204, which allows CDR data to be sent directly to server 203. Alternatively, server 124 may collect all of the CDR data, or server 124 may perform the record screening function itself, and forward the CDR information to server 203 via link 205. Users can access server 203 from workstation 206 to select and configure statistical reports.

Server 203 runs the quality assurance application, which integrates ISUP, TUP, NUP, TCAP, AIN, GSM, IS-41 and INAP transaction and call tracking on a per customer or per service provider basis. The quality assurance application performs statistics accumulation at the user part level and at the application level. Collected statistics are stored in a database, and reports from the statistics are available to users via workstation 206. The statistics are collected from the CDR data streams that are provided by monitors 119–122.

Figure 3:
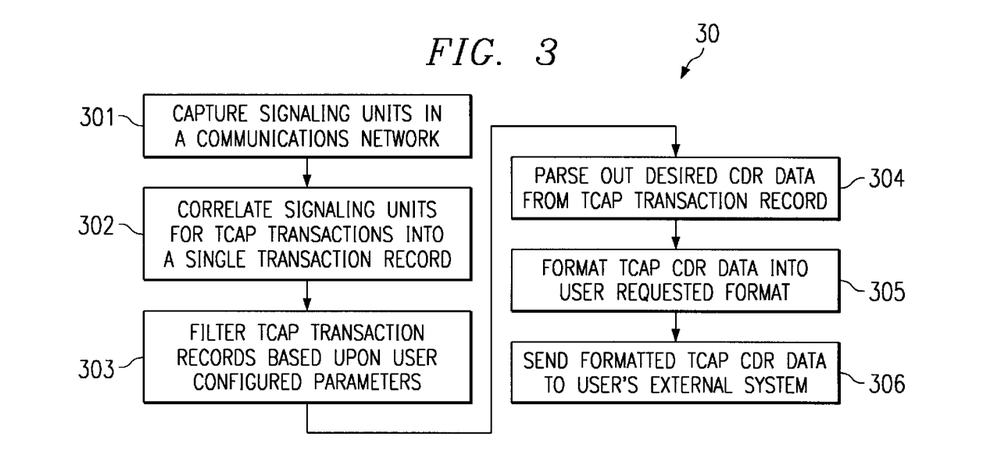
FIG. 3 is a flowchart that illustrates the creation of CDRs in accordance with one embodiment of the present invention.

Flowchart 30 of FIG. 3 illustrates the processes of gathering TCAP CDR data and sending the data to an external system, such as a network quality monitoring system. Although flowchart 30 illustrates a TCAP CDR process, it will be understood that the present invention is not limited to transaction-based CDRs. The present invention can be used to process any call, transaction or other communication CDRs. In step 301, network monitors capture signaling units from the links in a communications network, such as the SS7 network illustrated in FIGS. 1 and 2. These signaling units are then correlated by the monitors in step 302 and messages that relate to the same transaction or call are combined in a single record Monitors 119–122 may exchange signaling units across an inter-monitor communication link so that all messages that relate to a single transaction or call are correlated on an anchor monitor.

In step 303, after a TCAP transaction is completed and a transaction record is generated, the TCAP CDR system filters the record based upon the parameters configured by the user. The processing in step 303 may be completed by a processor on monitors 119–122 or by server 124. The server is capable of passing CDR filter data to each monitor so that filtering may be performed remotely on each monitor. Then, in step 304, the monitors parses out the desired data that the user has requested to configure the TCAP CDRs.

Alternatively, steps 303 and 304 may be performed on a central CDR server, such as server 124, or on an external system. Monitors 119–122 are capable of forwarding TCAP transaction records to server 124, which can in turn apply the filter criteria selected by the user. Once the records have been filtered, then server 124 parses out the selected components of the signaling units in the TCAP record in step 304. In other embodiments, the link monitors and the CDR server may cooperatively perform the functions of filtering records and parsing signaling unit components.

Once the desired signaling unit components have been parsed from the TCAP transaction record, the data is combined in step 305 into the CDR format that has been requested by the user. Finally, in step 306, the TCAP CDR data is sent to the user's external system. The TCAP CDR data may be sent to the external system as a continuous data stream. Alternatively, the TCAP CDR data may be stored by the monitoring system prior to being forwarded to the user. For example, server 124 or monitors 119–122 may be coupled to a database (not shown) that is capable of storing filtered TCAP transaction records or formatted TCAP CDRs.

Figure 4:
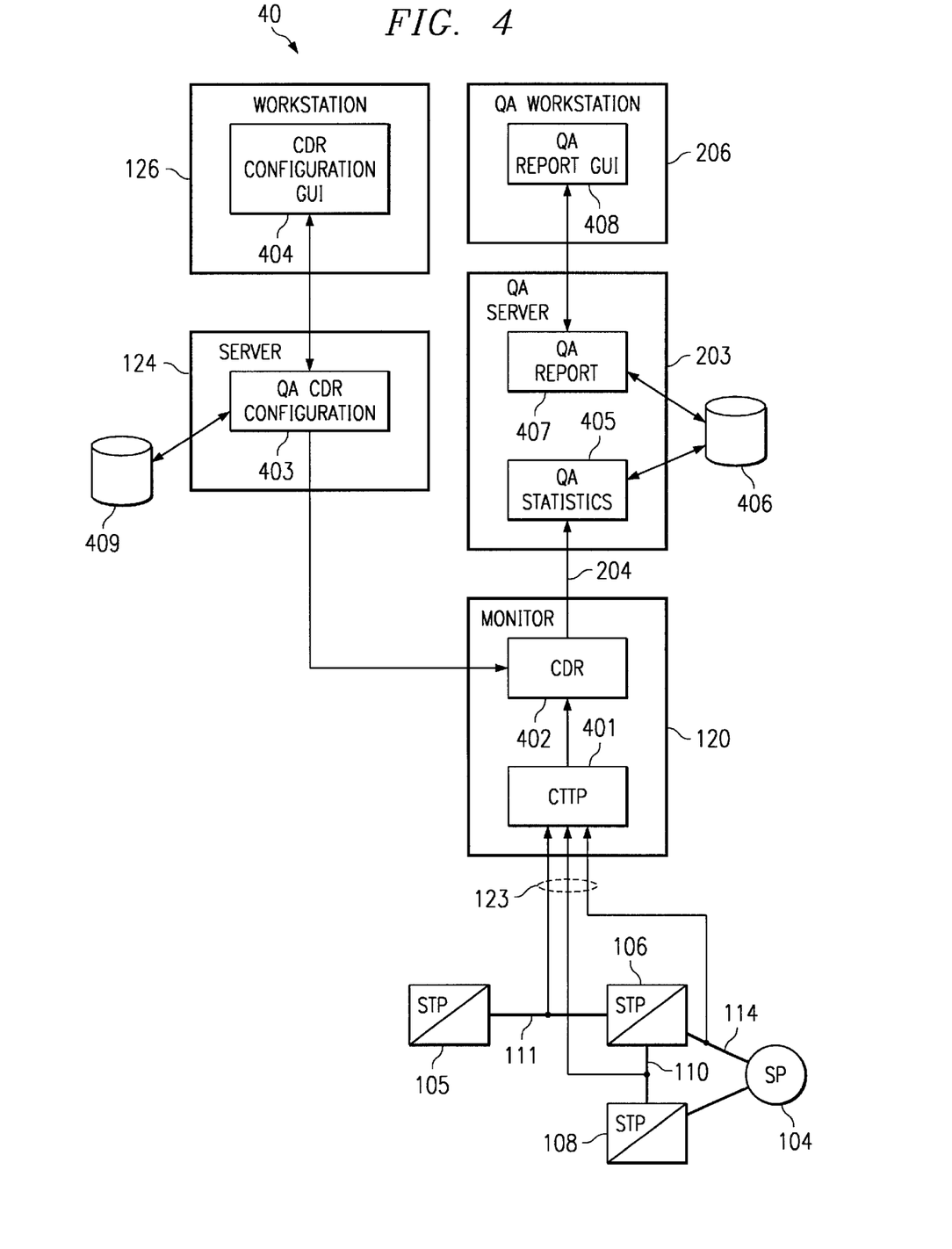
FIG. 4 is a block diagram that illustrates one embodiment of a quality assurance system.

FIG. 4 illustrates system 40 in which CDR applications are running on the components of a monitoring network and quality assurance applications are running on QA server 203 and workstation 206. Components of FIG. 4 are numbered to correspond with like components of FIG. 1 and 2. Monitor 120 is capable of monitoring several hundred SS7 links at one time. Monitor links 123 capture messages from network links, such as 111, 110 and 114, in the SS7 network. The messages are provided to a call/transaction processing application, such as Call/Transaction Tracking Processor (CTTP) 401. Monitor 120 comprises a number of versatile processors which may be assigned to process and correlate calls, transactions, or other messages. One or more of these processors run CTTP application 401 depending upon the volume of message traffic received from the SS7 network. As discussed above, monitor 120 communicates with other monitors, such as 119, 121 and 122, and exchanges messages pertaining to the calls and transactions that are being monitored.

Monitor 120 also comprises CDR application 402, which runs on another processor. CDR application 402 receives correlated message records from CTTP application 401 and filters the records using a CDR profile. Ideally, CDR application 402 receives complete records for each call and transaction from CTTP application 401. However, depending upon the state of a particular call or transaction, partial records may be provided. CDR application 402 collects messages for call legs and generates a Call Detail Record. The CDR contains summary information of the statistics for each call. Application 402 generates a binary CDR that is sent to QA server 203 via Transmission Control Protocol/Internet Protocol (TCP/IP) for further processing. There may be one or more QA servers coupled to the monitoring network or to individual monitors. Monitor 120 sends the CDR data to the QA server listed in a QA CDR profile.

Typically, the CDRs are not stored on monitor 120. The binary CDR data is streamed to QA server 203 as soon as it is created. A unique identifier is created for each CDR so that QA server can distinguish among the CDRs that are received from various monitors. Messages that are received out of sequence by CTTP application 401 are sent to CDR application 202, which attaches the out of sequence message to the CDR data stream.

Monitoring system server 124 is responsible for tracking all CDR configurations that have been set up by users. QA CDR configuration application 403 cooperates with CDR application 404 on workstation 126 to provide a user interface to configure the QA CDR profiles. Server 124 stores the QA CDR profiles as files in memory 409. The profiles are downloaded to monitors 119–122 as necessary so that the monitors will have the proper configuration to process the correlated message records.

Users configure the QA CDR profiles, and other monitoring system parameters, using workstation 126. CDR configuration application 404, which may be a Graphical User Interface (GUI), allows users to configure CDR profiles for storage on server 124. Information provided by users on workstation 126 is stored as a configuration file in database 409. Sever 124 downloads the configuration file data to specific monitors 119–122 over Simple Network Management Protocol (SNMP). Users may modify the CDR profile configurations. Changes to old configurations are relayed to the appropriate monitors 119–122.

QA server 203 is preferably a dedicated server for the quality assurance application because of the high volume of data associated with the call and transaction records. CDR data streams from monitors, such as data on link 204 from monitor 120, is processed by QA statistics application 405. Database 406 holds the CDR data for QA server 203. QA statistics application 405 collects CDRs from monitors 119–122 and stores the data to database 406. This data is then later recalled by QA report application 407, which reports statistics on the data when requested by users. QA workstation 206 provides the user interface to QA report application 407 through QA report GUI 208. Users configure the desired parameters for the statistical reports via QA report GUI 208. QA report application 407 then recalls and formats the stored data from database 406.

Depending upon the user's system, databases 406 and 409 may be an integral part of servers 124 and 203, or the databases 406, 409, may be embodied as separate storage devices.

The amount of data stored and the message traffic volume are the key determinants of the size and processing power of QA server 203. Processing capabilities can be adjusted on a per user basis. The minimum configuration of the preferred embodiment is a server having 150 GB storage and 1 GB memory. A redundant server having equivalent capacity may also be used. Workstation 206 provides users with a GUI interface to configure statistic reports.

QA server 203 collects CDRs from monitors 119–122 and extracts statistical information to be stored in database 406. CDRs for calls in an SS7 network are available upon call completion. QA statistics application 405 accumulates the messages statistics completion of the call or transaction and adds the statistics to database 406 at intervals based upon the origination time of the call or transaction. The statistics are continually collected and stored to database 406, but they are reported only upon user request.

The format used to store the statistics data in database 406 is highly configurable and may be adapted for any storage configuration that the user may desire. For example, in one embodiment, separate data entries are made for each hour in a daily table in database 20. Thus, if server 203 and database 406 are configured to hold a week's worth of statistical data, then seven daily tables, each having 24 intervals, are stored on database 406. Each daily table is stored for seven days. Daily tables are summarized into weekly tables at the end of seven days. Weekly tables have seven intervals, each interval representing a summarized daily table. Weekly tables are stored for 90 days, at which point they are summarized into monthly tables having 28–31 intervals. Monthly tables are stored locally on database 406 as long as space permits. The aging and summarizing process can be customized by users to comply with individual requirements.

Table 5 is a list of statistics that are stored to database 406 for each CDR profile.

TABLE 5

Number of Call Attempts
Number of Call Attempts Answered
Number of User Busy Calls
Number of Ring No Answer (RNA) Calls
Number of Normal Release Calls
Number of Abnormal Release Calls
Number of Unallocated Number Calls
Number of Address Incomplete Calls
Number of Transaction Aborts
Number of Congested Transactions
Number of Congested Calls
Number of Circuit Unavailable Calls
Number of Failed Transactions
Number of Failed Calls

TABLE 5-continued

Number of Undefined Release Cause Failed Calls
Number of Destination Out of Order Failed Calls
Average Call Set-Up Time
Average Call Hold Time
Average Answer Seizure Ratio
User Defined The user can define specific statistics, such as release causes, that are to be stored for a particular CDR profile.

Table 6 is a list of aggregations that can be used to group the above statistics for reports to be generated by QA report application 407.

TABLE 6

Calling Numbers
Called Numbers
Translated Numbers
Called Numbers, then by Calling Numbers
Translated Numbers, then by Calling Numbers
Called Numbers, then by Translated Numbers
Services
Services, then by Calling Numbers
Services, then by Called Numbers In Table 2 it will be understood that called, calling or translated numbers may be either a complete telephone number or a partial telephone number. For example, under the North American Numbering Plan, reports may be created for full telephone numbers (i.e. 1-NPA-NXX-XXXX). Alternatively, wildcards can be used at the end of the grouping telephone number so that statistics are reported for all calls or transactions directed to a particular area code (i.e. 1-NPA) or a particular exchange code (i.e. 1-NPA-NXX).

Users can also configure QA report application 407, via QA report GUI 208, to create their own query parameters. Queries can be stored in database 406 and stored queries can be modified. Reports from QA report application 407 may be displayed to the user on QA workstation 206. Alternatively, reports may be printed, directed to an electronic mail address, stored to a database file, or exported to an ASCII file. Users can configure weekly, monthly, or other periodic reports which are sent at intervals to specific users. Such periodic reports may be assigned to QA report application 407 to be run automatically.

Dynamic behavioral statistics may also be generated by QA report application 407. Users can select to have the statistics of Table 1 reported as to the highest and/or lowest values. For example, a report may comprise the 16 highest called numbers, or the 16 services that are used the least. Behavioral statistics are retrieved using a Structured Query Language (SQL) query. Triggers can be configure to update a user's display according to changes in database 406. Once a group or aggregation of statistics is displayed, users can refine the report to obtain more specific data, such as a specific area code and exchange.

Users may track statistical events by designating a statistics to be displayed based upon a first occurrence, a occurrence that is more than some delta away from a certain value, or rising/falling thresholds. When triggered, events may be displayed to the user, or stored to a log file.

Users may also designate specific link sets or network nodes to be used for the statistical reports. Only those monitors that are coupled to the relevant links and nodes will receive the CDR profile data and only those monitors will send CDRs to QA server 203 for that profile.

Real-time statistics are also available from QA report application 407. Statistics are then updated after call or transaction completion and CDR generation. Displayed reports may be in the form of peg counts, bar graphs, or trend curves. Users may also configure reports based upon a sample of the calls or transactions or based upon a sample of the CDRs. The sampling rate may be selected using CDR generation GUI 404 on the user workstation.

It will be understood that workstation 126 and 206 may be separate components as described herein, or one workstation may be used to run both CDR configuration GUI 404 and QA report GUI 408.

It will also be understood that the QA server can accept CDR data from any source, not only from the monitoring system. For example, a switch or end office may generate CDRs and provide the data directly to the QA server for further processing. The QA server has a modularized front end which allows it to receive data from any source.

Reporting and measuring of the CDR data allows users to define any number of digit combinations. A leading digit summary is defined as an aggregation of CDRs associated with a selected prefix. This parameter returns a composite result on numbers having the selected prefix, instead of providing results for each discrete number within the number range. For example, an entry of 972 returns a single measurement for all calls with the 972 prefix. An entry of 972-578-0000 returns two measurements; a measurement for 972-578-0000 as well as a measurement in the 972 leading digit summary aggregation entry.

In a preferred embodiment, a service quality monitoring system provides a stand-alone CDR processing system that is separate from, and external to, a network monitoring system. The service quality monitoring system provides performance monitoring statistics based on CDRs that are acquired from a network surveillance system. The CDR data can be analyzed through a real-time interface or through a historical reporting tool. The network quality monitoring system is capable of monitoring any communications network, such as an SS7 network, and provides information about the network to a user or operator. The system integrates data from CDRs on a per customer and/or per dialed service basis and provides historical performance data that helps to ensure that optimum service quality is provided to network customers. The service quality application receives CDRs that are streamed from the network monitoring system and processes the CDRs by filtering, analyzing and storing the CDR information. CDRs are stored in a database that is accessed by the historical reporting tool to generate user-requested reports. The received CDRs are also filtered and analyzed as they are received to generate real-time reports and/or alarms for the user or operator.

The quality monitoring system software may run on one or more system components. A dedicated CDR server may be required if a high volume of historical data is expected The data on the CDR server can be stored in an associated database. The CDR server includes one or more processors that are responsible for collecting and processing CDRs and for generating performance monitoring statistics. The CDR server also provides data to users and operators upon request. The amount of data to be stored and the volume of traffic expected determine the processing power that is required in the CDR server.

Users access the historical reports and real-time data through a PC client. The service quality monitoring system may also include a web-reporting tool and a web server that are used to provide platform independent access to the historical data. As a result, the historical database and real-time data may be accessed remotely, for example, via a private computer network, such as a Local Area Network (LAN) or Wide Area Network (WAN), or via a global computer network, such as the Internet or World Wide Web.

Figure 5:
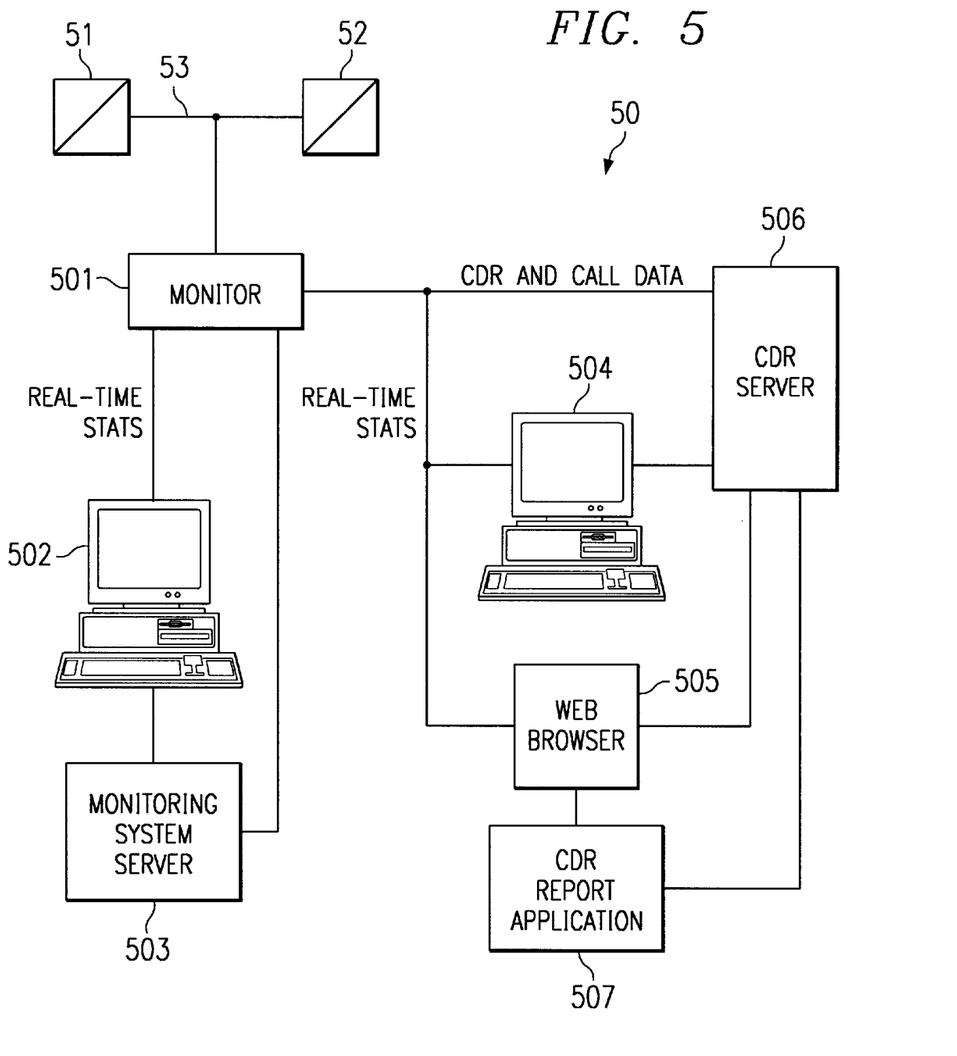
FIG. 5 is a block diagram of a network quality monitoring system that is independent of the network monitoring system.

A stand-alone, independent service quality monitoring system is illustrated in FIG. 5. Communication network nodes 51 and 52 may be any two nodes that are connected by link 53. Nodes 51 and 52 are each typically connected to additional nodes by other links which are not shown in FIG. 5 to simplify the drawing. Calls, transactions and/or other communication messages are exchanged between nodes 51 and 52 over link 53. Individual ones of these messages are associated with any number of unrelated calls, transactions and other communications across a network. Monitor 501 captures these messages as described herein and correlates related messages into communications detail records, such as call or transaction records. Monitor 501 may capture messages from one or more links. A number of such monitors 501 that are coupled to all or most of the links in a communication network are used to capture substantially all the messages in the network. Monitors 501 may be linked to each other and they may exchange data via an inter-monitor bus (not shown) as described in the related applications.

Monitoring unit 501 is coupled to monitoring system server 503, which maintains system configuration information. Monitor 501 may send CDRs and other message data to server 503 for further processing or storage. Network operators access monitors 501 and monitoring system server 503 via workstation 502. Operators use workstation 502 to configure the monitoring system and to access CDR or other data. Workstation 502 may also be used to configure and receive alarms and real-time performance statistics.

Server 502 acts as the central information point for all entities in the network monitoring system. Any entity, such as monitor 501, that needs common information can obtain that information from a database on server 502. Server 502 maintains the configuration information for all the applications that are provided by monitors 501. Network information that is provided by the user or operator is stored in a configuration file on server 502. A configuration process downloads configurations to specific monitors 501, for example, using SNMP. The configuration process also accepts new configurations and receives changes to old configurations from workstation 502 or external client 504. New or updated information is immediately relayed to the appropriate monitors 501.

Monitor 501 may be configured to send CDR data to external equipment, such as a CDR server 506. CDR server 506 may be an external network service quality application. External workstation 504 and web browser 505 allow users to access the CDR information and performance statistics remotely. Monitor 501 collects message data for call and transaction legs from a tracking process. Then monitor 501 correlates associated messages and generates a communication detail record or CDR. The CDR contains summary information of the call, transaction or other communication. Monitor 501 then generates a binary CDR stream that is sent via Transmission Control Protocol/Internet Protocol (TCP/IP) to devices that are listed in a configuration profile. The configuration profile may use pointcodes to designate external devices or the CDR profile may be global. A unique identifier is generated for every CDR to guarantee system-wide uniqueness. The binary CDR is sent to the external device, such as to CDR server 506, as soon as it is created. The CDRs can also be stored on monitor 501 and sent at regular intervals or at a preset time. Typically, the CDR information is sent as call or transaction legs are closed.

Server 503 may send a configuration profile to monitor 501 directing the monitor to send CDRs to server 506 for storage in a historical statistics database. Monitor 501 can also be configured to deliver real-time performance monitoring statistics to an application running on workstation 504. Workstation 504 can access historical CDR statistics from server 506 in addition to receiving real-time data.

Attempt-based statistics are collected and stored in the historical database at server 506. Service quality applications can generate performance statistics based on the digits in the stored CDRs. The digits may include all of, or part of, the calling number, dialed number or translated number. Historical data can be provided for indexes that are digit-based or based on pointcode by simplex digit. Attempt-based statistics are collected and stored in a historical database for CDRs based on complex digit combinations. The digit combinations for user provisioned calling numbers may be based on, for example, calling number by dialed number. For user provisioned dialed number, the statistics may be collected and stored based on, for example, dialed number by calling number, dialed number by translated number, or translated number by calling number. In the preferred embodiment, historical data for a complex index will be CDR based only and not pointcode keyed.

The service quality monitoring system also may include a web-reporting tool. Web browser client 505 is used to provide platform independent access to both real-time and historical CDR data. The historical database is accessible from any standard web browser via the web-reporting tool 505. This allows the user to execute and view reports remotely via the web interface.

Completed CDRs are available at call-completion. Call statistics for CDRs are accumulated after delivery of the CDR to CDR server 506. Pointcode by simplex digit statistics are accumulated on monitors 501 and retrieved by CDR server 506 on a user-defined interval basis. In a preferred embodiment, all data is accumulated based on call origination time. Statistics applicable to a current configuration are collected continuously. Real-time data is typically pointcode keyed on calling party and dialed number.

Table 7 illustrates the type of statistics that can be generated from the historical CDR data on CDR server 506.

TABLE 7

Total Call Attempts
Total Calls Answered
Total Calls with Address Complete
Failed Calls
Release Cause
Abnormal Release
User Busy
Normal Release
Circuit Unavailable
Network Congestion
Network Failures
Average Setup Time
Average Hold Time
Average Conversation Time Table 8 illustrates the type of information that may be used to configure a profile for the service quality monitoring system.

TABLE 8

| Provisioning index type | Calling numbers |
|---|---|
|  | Dialed numbers |
| Number Provisioning | Telephone numbers to be tracked |
|  | Complete number |
|  | Partial number |

TABLE 8-continued

| | |
|---|---|
| | Partial number with trailing wildcard |
| | Alias name |
| Results Required, Real-Time | Pointcode by calling number performance |
| | Pointcode by Dialed number performance |
| Results Required, Historical | Calling number by Dialed number performance |
| | Pointcode by Calling number performance |
| | Calling number performance on digits only |
| | Pointcode by Dialed number performance |
| | Dialed number performance on digits only |
| | Dialed number by translated number performance |
| | Dialed number by calling number performance |
| | Translated number by calling number performance |
| Filtering of pointcodes | |
| Filtering of signaling groups | |
| Application type used within the network | |
| Number of digits for secondary number indexes | |

Operators can create their own queries or modify existing queries. Reports that are generated from the historical database can be viewed, printed or saved using a standard PC. Using web-based or global access, a report can be generated through any standard web-browser. Users can also configure hourly, daily, weekly or monthly reports that are automatically generated. These prescheduled reports can be sent to specific users via electronic mail.

Preconfigured reports are also available to the users. These reports depend upon the index tracking options, such as calling party or dialed number, that are available to the operator. The reporting tool also allows users to create new reports using the existing data in the database. For example, a report could be created for the ratio results of a comparison of any measurements. Other reporting features include formatting, filtering and other options.

Users can format Reports using thresholds, sorting and graphing parameters. Reports can be configured to highlight data that exceeds a user defined threshold. Data results can be sorted in ascending or descending order for any parameter. Users can graphically display report data on workstation 502 or 504.

Users can configure the reports so that the CDR data is filtered to show selected parameters only. Threshold filtering can also be used to create reports that show data that exceeds a user defined threshold. Time range filtering can be used to shows data within a user-selected period of time. Digits filtering is used to show CDR data for numbers that have a user-defined digits prefix. Digit level filtering aggregates data row totals using a user-defined digit level. Reports can also be configured to provide a snapshot of the service performance data and to provide different levels of summary totals for various report types.

Number alias filtering displays data that is defined by a user-selected number alias. A series of numbers or a group of numbers can be assigned to a number alias or a service name that is defined by the user. Reports can then be generated using the alias name. The statistics for all of the numbers that belong to a selected number alias or service name will be aggregated together. In a preferred embodiment, a report selection macro in the form of a dialog is provided for the user to select a report to open based on report type, filter type (digit, alias, alias/digit), and aggregation level. Standard reports and graphs including 'ranking' reports to show the 'top 10' disabled or dialing numbers for a specific measurement. The reporting tool supports user-defined exclusion entries, for example, by providing aggregate measurements for all dialed numbers in a selected NPA-NXX except for a specific number or numbers.

Reporting and measuring of the CDR data allows users to define any number of digit combinations. A leading digit summary is defined as an aggregation of CDRs associated with a selected prefix. This parameter returns a composite result on numbers having the selected prefix, instead of providing results for each discrete number within the number range. For example, an entry of 972 returns a single measurement for all calls with the 972 prefix. An entry of 972-578-0000 returns two measurements; a measurement for 972-578-0000 as well as a measurement in the 972 leading digit summary aggregation entry.

The quality monitoring system manages the CDR profiles so that they do not generate several CDRs for the same call leg. The system also correlates multiple related CDRs to produce a single CDR per event. The CDR processing system is also capable of processing translated numbers. When the call legs are delivered to the CDR analysis system, then the calling, dialed number and translated number fields are populated.

Users can set up a statistical event alarm on any real-time profile so that statistical event alarms are displayed when alarm conditions are detected.

In a preferred embodiment, the minimum granularity is five minutes of data. The granularity can also be configured to be traffic dependent. All data is entered in appropriate hourly, daily, weekly, and monthly tables. The quantity of hourly, daily, weekly, and monthly tables stored in the database is dependent upon the amount of hard disk space procured with the CDR server hardware 506. The system is capable of using additional on-line CDR storage.

The quality monitoring system application can be configured to sample only a percentage of CDRs to populate the historical database. Users can select an appropriate sampling rate through the CDR configuration profile set-up. The system application hardware is configured as per the customers sampling requirements. All of the quality statistics may be stored for the sampled set of CDRs.

The CDR analysis system also has analysis tools to provide users with the ability to drill down and analyze data at specific geographic, node, link, call, transaction or message levels.

Although the invention has been described with respect to an SS7 system, it will be understood that the present invention may be adapted to monitor the quality of service provided on any communications network.

The present invention and its advantages have been described in detail herein, however, it should be understood that various changes, substitutions and alterations can be made herein without departing from the spirit and scope of the invention as defined by the appended claims.

What is claimed is:

1. A method for monitoring the service quality in a communications network, wherein a communication monitoring system generates communication detail records for communications on said network, the method comprising the steps of:

capturing, at monitoring units, messages from one or more communication links in the communication network, wherein each message corresponds to a specific one of a plurality of calls or transactions, and wherein a plurality of messages are associated with each of said calls or transactions;

identifying a first-detected message for a particular call or transaction;

designating a monitoring unit that detected said first-detected message as an anchor monitor for the particular call or transaction;

forwarding any other messages associated with the particular call or transaction to the anchor monitor;

correlating, at the anchor monitor, all of the messages associated with the particular call or transaction into a call detail record for the particular call or transaction, wherein the call detail record comprises all of the messages associated with the particular call or transaction that have been captured by all monitors from all links in the communications network;

transmitting said call detail records directly from said anchor monitor to a quality of service application;

filtering said call detail records to generate a historical report of service quality on said network, wherein said call detail records are filtered according to a user configured profile to generate said historical reports; and filtering said call detail records as they are received to generate real-time service quality reports.

2. The method of claim 1 further comprising the step of:

storing the call detail records at said anchor monitor upon a loss of communication between said anchor monitor and said quality of service application.

3. The method of claim 1 wherein said call detail records are Transaction Control Application Part Call Detail Records (TCAP CDR).

4. The method of claim 1 further comprising the step of:

allowing a user to modify said configuration profile via a global computer network.

5. The method of claim 1 further comprising the steps of:

monitoring said real-time service quality reports for alarm conditions; and notifying a user when an alarm condition is detected.

6. The method of claim 5 wherein said real-time service quality reports are monitored using a user configured profile to detect said alarm conditions.

7. A system for monitoring service quality in a communications network having associated network monitoring equipment for monitoring communications across said network, said system comprising:

communications network monitoring devices coupled to communication links in the communication network, each of the monitoring device comprising:

means for capturing messages from said communication links, wherein each message corresponds to a specific one of a plurality of calls or transactions, and wherein a plurality of messages are associated with each of said calls or transactions;

means for identifying a first-detected message for a particular call or transaction;

means for designating one of said monitoring devices as an anchor monitor for the particular call or transaction, if that monitor detected the first-detected message;

means for forwarding other messages associated with the particular call or transaction to the anchor monitor;

means for correlating all of the messages associated with the particular call or transaction into a call detail record for the particular call or transaction, wherein the call detail record comprises all of the messages associated with the particular call or transaction that have been captured by all monitors from all links in the communications network;

means for transmitting said call detail records directly from said anchor monitor to a service quality application processor that is separate from said communications network monitoring devices;

a database associated with said processor for storing said communication detail records;

means for filtering said communication detail records using a user defined profile to identify selected ones of said communication detail records;

means for generating a report of historical network quality using said selected ones of said communication detail records; and means for filtering said communications detail records to identify communication detail records to be displayed to a user in real-time.

8. The system of claim 7 further comprising:

means to display said historical reports to said user; and means to display said call detail records to said user in real-time.

9. The system of claim 8 wherein said historical display means and said real-time display means are the same device.

10. The system of claim 8 wherein said display means provide a graphical user interface for said users.

* * * * *